US009488796B2

(12) United States Patent
Smrha et al.

(10) Patent No.: US 9,488,796 B2
(45) Date of Patent: *Nov. 8, 2016

(54) ADAPTER PANEL WITH LATERAL SLIDING ADAPTER ARRAYS

(71) Applicant: CommScope Technologies LLC, Hickory, NC (US)

(72) Inventors: Mark Smrha, West Chicago, IL (US); Hutch Coburn, Eden Prairie, MN (US); Chad James Sjodin, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/813,740

(22) Filed: Jul. 30, 2015

(65) Prior Publication Data

US 2015/0331215 A1  Nov. 19, 2015

Related U.S. Application Data

(63) Continuation of application No. 14/617,249, filed on Feb. 9, 2015, which is a continuation of application No. 13/722,438, filed on Dec. 20, 2012, now Pat. No. 8,953,921, which is a continuation of application (Continued)

(51) Int. Cl.
| | |
|---|---|
| *G02B 6/00* | (2006.01) |
| *G02B 6/44* | (2006.01) |
| *H04Q 1/14* | (2006.01) |
| *H04Q 1/02* | (2006.01) |
| *H04Q 1/06* | (2006.01) |
| *H04Q 11/00* | (2006.01) |

(52) U.S. Cl.
CPC ........... *G02B 6/4452* (2013.01); *G02B 6/4446* (2013.01); *G02B 6/4455* (2013.01); *H04Q 1/023* (2013.01); *H04Q 1/06* (2013.01); *H04Q 1/142* (2013.01); *H04Q 11/0003* (2013.01)

(58) Field of Classification Search
CPC   G02B 6/4452; G02B 6/3897; G02B 6/4471; G02B 6/3825; G02B 6/4454; G02B 6/00
USPC ................................ 385/134, 135, 136, 137
See application file for complete search history.

(56) References Cited

U.S. PATENT DOCUMENTS

| | | |
|---|---|---|
| 4,765,710 A | 8/1988 | Burmeister et al. |
| 5,129,030 A | 7/1992 | Petrunia |

(Continued)

FOREIGN PATENT DOCUMENTS

| | | |
|---|---|---|
| EP | 0 341 027 A2 | 11/1989 |
| EP | 1 603 345 A2 | 12/2005 |
| KR | 20060111757(A) | 10/2006 |

OTHER PUBLICATIONS

ADC Telecommunications *Fiber Outside Plant Systems*, 4 pgs.; Aug. 1998.

(Continued)

*Primary Examiner* — Jennifer Doan
(74) *Attorney, Agent, or Firm* — Merchant & Gould P.C.

(57) ABSTRACT

An adapter panel arrangement including a chassis and a panel of adapters. The adapters defining open rearward cable connections and open forward cable connections of the panel arrangement. The adapters being arranged in arrays that slide independently of other adapter arrays to provide access to the open rearward and open forward cable connections.

42 Claims, 10 Drawing Sheets

Related U.S. Application Data

12/930,783, filed on Jan. 14, 2011, now Pat. No. 8,340,490, which is a continuation of application No. 12/460,161, filed on Jul. 13, 2009, now Pat. No. 7,873,252, which is a continuation of application No. 11/655,760, filed on Jan. 19, 2007, now Pat. No. 7,570,860.

(56) References Cited

U.S. PATENT DOCUMENTS

| | | | |
|---|---|---|---|
| 5,167,001 | A | 11/1992 | Debortoli et al. |
| 5,497,444 | A | 3/1996 | Wheeler |
| 5,717,810 | A | 2/1998 | Wheeler |
| 5,758,003 | A | 5/1998 | Wheeler et al. |
| 5,778,131 | A | 7/1998 | Llewellyn et al. |
| 6,195,493 | B1 * | 2/2001 | Bridges .............. G02B 6/4452 385/134 |
| 6,385,381 | B1 * | 5/2002 | Janus .................. G02B 6/4441 385/135 |
| 6,504,988 | B1 | 1/2003 | Trebesch et al. |
| 6,591,051 | B2 | 7/2003 | Solheid et al. |
| 6,715,619 | B2 | 4/2004 | Kim et al. |
| 6,752,665 | B2 | 6/2004 | Kha et al. |
| 6,760,531 | B1 | 7/2004 | Solheid et al. |
| 6,804,447 | B2 | 10/2004 | Smith et al. |
| 6,920,274 | B2 | 7/2005 | Rapp et al. |
| 6,937,807 | B2 | 8/2005 | Franklin et al. |
| 6,944,383 | B1 | 9/2005 | Herzog et al. |
| 7,094,095 | B1 | 8/2006 | Caveney |
| 7,194,181 | B2 | 3/2007 | Holmberg et al. |
| 7,200,316 | B2 | 4/2007 | Giraud et al. |
| 7,257,223 | B2 | 8/2007 | Sajadi et al. |
| 7,273,320 | B2 * | 9/2007 | Ellis .................... G02B 6/3807 385/134 |
| 7,318,751 | B2 | 1/2008 | Erdman et al. |
| 7,376,322 | B2 * | 5/2008 | Zimmel ............... G02B 6/4452 385/134 |
| 7,474,828 | B2 | 1/2009 | Leon et al. |
| 7,570,860 | B2 | 8/2009 | Smrha et al. |
| 7,570,861 | B2 | 8/2009 | Smrha et al. |
| 7,873,252 | B2 | 1/2011 | Smrha et al. |
| 7,873,253 | B2 | 1/2011 | Smrha et al. |
| 8,179,684 | B2 | 5/2012 | Smrha et al. |
| 8,340,490 | B2 | 12/2012 | Smrha et al. |
| 8,346,044 | B2 | 1/2013 | Smrha et al. |
| 8,867,884 | B2 | 10/2014 | Smrha et al. |
| 8,953,921 | B2 | 2/2015 | Smrha et al. |
| 8,991,950 | B2 | 3/2015 | Privitera et al. |
| 9,097,871 | B2 | 8/2015 | Smrha et al. |
| 2003/0174996 | A1 | 9/2003 | Henschel et al. |
| 2003/0223723 | A1 | 12/2003 | Massey et al. |
| 2004/0086252 | A1 | 5/2004 | Smith et al. |
| 2006/0261015 | A1 | 11/2006 | Blackwell |
| 2006/0275008 | A1 | 12/2006 | Xin |
| 2009/0129033 | A1 | 5/2009 | Smrha et al. |
| 2011/0267794 | A1 | 11/2011 | Anderson et al. |
| 2015/0131958 | A1 | 5/2015 | Smrha et al. |
| 2015/0286021 | A1 | 10/2015 | Smrha et al. |
| 2015/0331214 | A1 | 11/2015 | Smrha et al. |
| 2015/0331216 | A1 | 11/2015 | Smrha et al. |
| 2015/0338593 | A1 * | 11/2015 | Smrha ................. G02B 6/4452 385/135 |
| 2015/0338594 | A1 | 11/2015 | Smrha et al. |
| 2015/0338595 | A1 | 11/2015 | Smrha et al. |
| 2015/0338597 | A1 | 11/2015 | Smrha et al. |
| 2015/0338598 | A1 | 11/2015 | Smrha et al. |
| 2015/0338599 | A1 | 11/2015 | Smrha et al. |

OTHER PUBLICATIONS

ADC Telecommunications *Fiber Panel Products*, Second Edition, 6 pgs.; Jul. 1996.

Corning Cable Systems; "Jumper Routing Procedure for Enhanced Management Frame"; Issue 2; Apr. 2002; 4 pgs.

Drawing of ADC Telecommunications Drawer, 1 page; Aug. 2006.

Drawing of ADC Telecommunications Drawer, 2 pages, Nov. 2006.

LC Connector Products (Fiber), The Siemon Company, Feb. 2000, 4 Pages.

Lightwave—Fiber remains medium of choice for data center applications, www.lightwaveonline.com; Apr. 1, 2007, 5 Pages.

FONS Introduces Family of Rack Mount Splice Shelves; A Natural Extension to FONS Suite of High-Density Products for Complete Fiber-to-the-'X' Solutions, Business/Technology Editors Optical Fiber Communications 2002, Business Wire (New York), Apr. 3, 2002, 3 Pages.

APA Cable & Networks Unveils 288-Port Fiber Distribution Panel for Central Office Use; Customizable Fiber Cable Panel is One of Densest in the Industry; Modular Design Allows Telcos, CLECs, MSOs to Expand Capacity as Needed, PR Newswire (New York), Jun. 20, 2006, 3 Pages.

McCreary, Scott A. et al., Increasing rack capacity: An ongoing challenge, Fiberoptic Product News 16.5, May 2001, 7 Pages.

SYSTIMAX Solutions, "The SYSTIMAX 110 VisiPatch System—Clearly the Way Ahead," May 2004 (3 pgs).

SYSTIMAX Solutions, "The SYSTIMAX iPatch System," Jun. 2004 (8 pgs).

SYSTIMAX Solutions, "SYSTIMAX InstaPATCH System," Aug. 2004 (7 pgs).

SYSTIMAX Solutions, "SYSTIMAX G2 Fiber-Optic Connectivity Solution," Jun. 2005 (10 pgs).

SYSTIMAX Solutions, "SYSTIMAX InstaPATCH Plus Modular Shelf and DM2 Modules," Jun. 2005 (3 pgs).

\* cited by examiner

ADAPTER PANEL WITH LATERAL SLIDING ADAPTER ARRAYS

CROSS-REFERENCE TO RELATED APPLICATIONS

This application is a continuation of application Ser. No. 14/617,249, filed Feb. 9, 2015, which is a continuation of application Ser. No. 13/722,438, filed Dec. 20, 2012, now U.S. Pat. No. 8,953,921, which is a continuation of application Ser. No. 12/930,783, filed Jan. 14, 2011, now U.S. Pat. No. 8,340,490, which is a continuation of application Ser. No. 12/460,161, filed Jul. 13, 2009, now U.S. Pat. No. 7,873,252, which is a continuation of application Ser. No. 11/655,760, filed Jan. 19, 2007, now U.S. Pat. No. 7,570,860, which applications are incorporated herein by reference in their entirety.

FIELD

This disclosure relates to devices for use in the telecommunications industry, and associated methods. More specifically, this disclosure relates to a termination panel for use in the telecommunications industry, and methods associated with termination panels.

BACKGROUND

Many local area networks and telecommunication systems utilize termination panels to provide cross-connections between telecommunications equipment. Demand for greater telecommunication services has prompted the increase in circuit densities of termination panels. Notwithstanding the advances made in the art, there is a continuous need for further advances to improve upon high-density termination panels and associated methods. Improvements are needed, for example, to enhance termination access and cable management associated with installation, maintenance, repair, upgrade, and cross-connection procedures related to termination panels.

SUMMARY

The present disclosure relates to an adapter panel arrangement including a chassis and a panel of adapters. The adapters define open rearward cable connections and open forward cable connections of the panel arrangement. The adapters are arranged in arrays that slide independently of other arrays to provide access to the open rearward and open forward cable connections.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
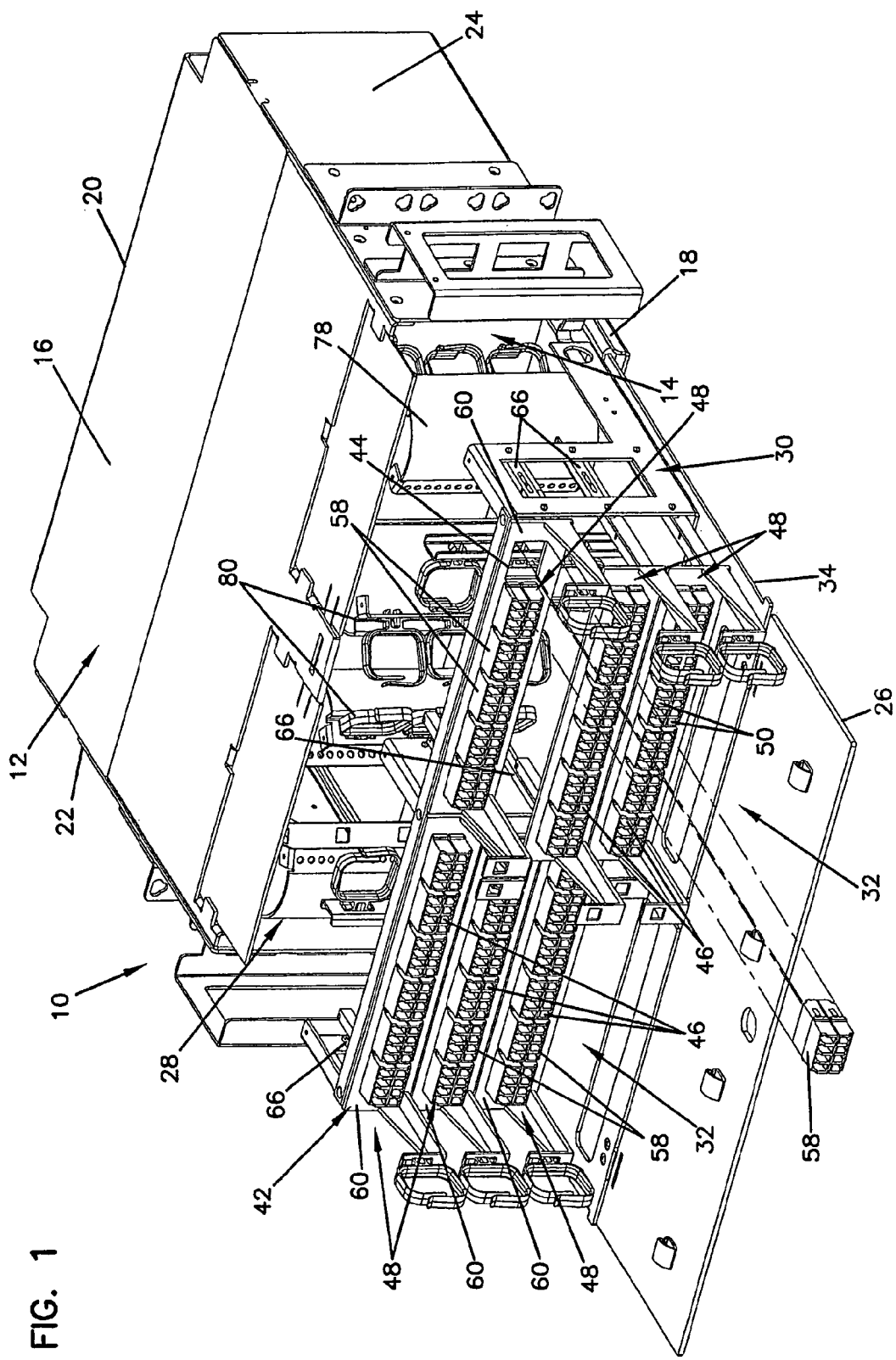
FIG. 1 is a front perspective view of one embodiment of an adapter panel arrangement, in accordance with the principles disclosed, shown with a drawer of the adapter panel arrangement in an open position.

FIG. 1 illustrates a distribution frame or adapter panel arrangement 10 in accordance with the principles disclosed. The adapter panel arrangement 10 is designed to provide a high density of cable terminations, yet facilitate access to the cable terminations from the rear during installation procedures, and from the front during post-installation procedures.

Figure 2:
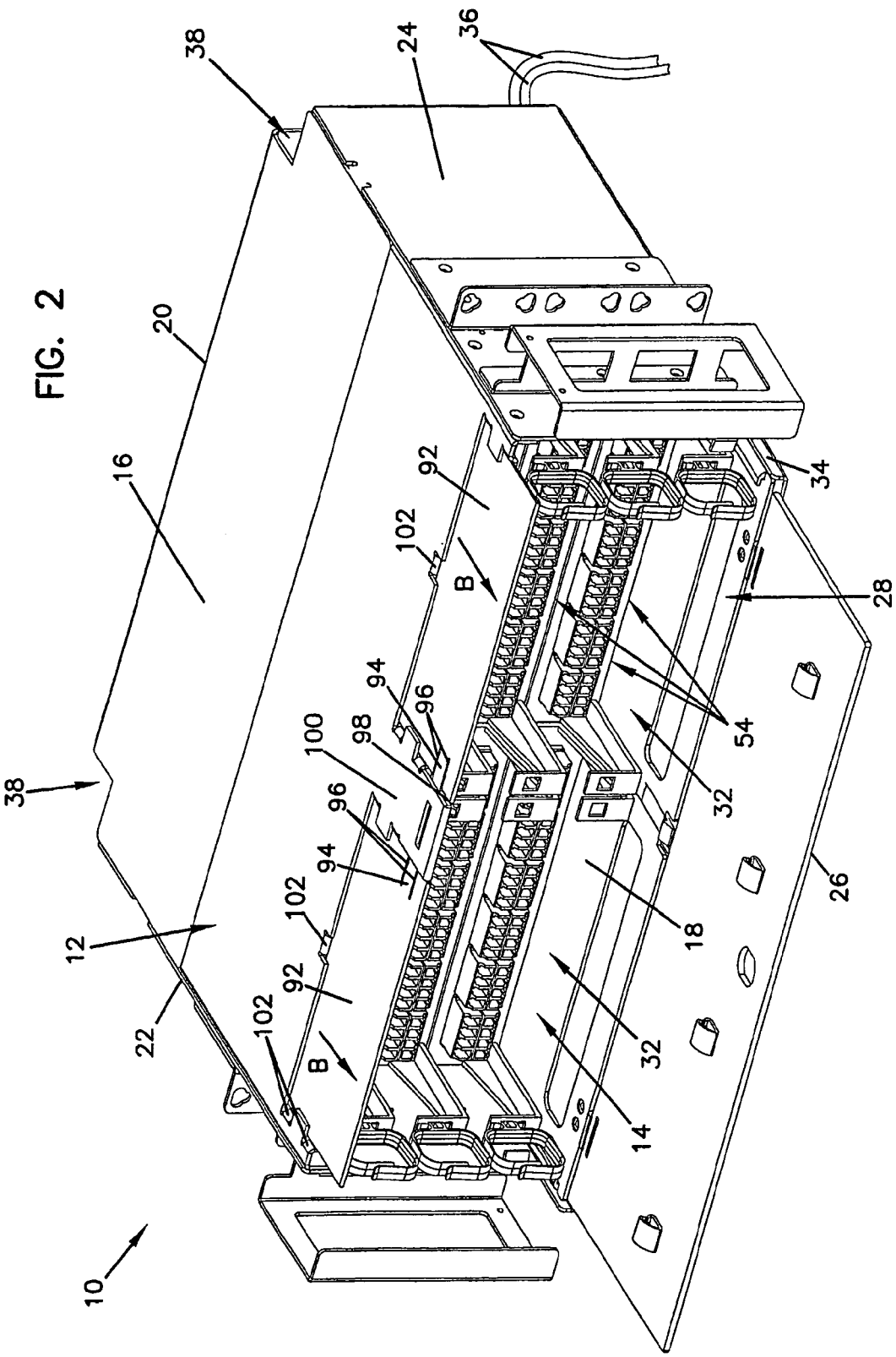
FIG. 2 is a front perspective view of the adapter panel arrangement of FIG. 1, shown with the drawer in a closed position.
Figure 3:
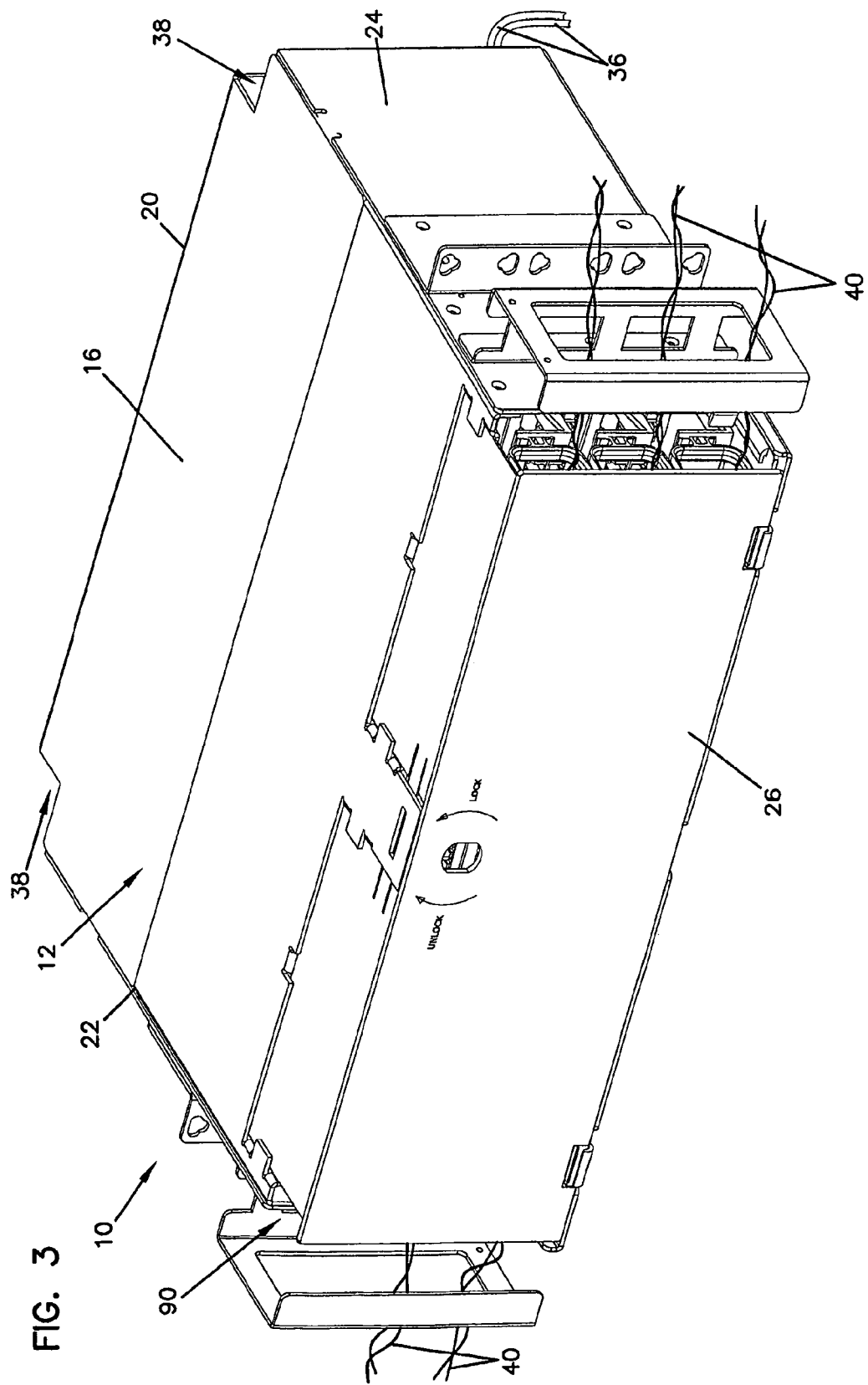
FIG. 3 is a front perspective view of the adapter panel arrangement of FIG. 2, shown with a cover of the arrangement closed.

The adapter panel arrangement 10 of the present disclosure generally includes a chassis 12 having an interior 14. The interior 14 is defined by a top wall 16, a bottom wall 18, a rear wall 20, and side walls 22, 24. The adapter panel arrangement 10 also includes a sliding drawer 34 that slides between an open position (FIG. 1) and a closed position (FIG. 2). A front cover 26 is attached to the sliding drawer 34. When the drawer 34 is in the closed position, the front cover 26 encloses the interior 14 of the chassis 12 when closed (FIG. 3) and provides access to the interior 14 when open (FIG. 2).

Referring now to FIGS. 1 and 2, the adapter panel arrangement 10 includes a framework structure 30 (FIG. 1) that is attached or mounted to the drawer 34. A panel of adapters 32 is mounted to the framework structure 30. As will be described in greater detail hereinafter, the drawer 34 is designed to slide outward from the chassis 12 primarily for installation purposes. That is, the drawer 34 can be slid to the open position during installation or assembly of the adapter panel arrangement, but is position in the closed position (FIG. 2) during operative use of the arrangement 10. During operative use, the framework structure 30 and the panel of adapters 32 are located within the interior 14 of the chassis 12 and the drawer 34 is in the closed position (FIG. 2). A user accesses the panel of adapters 32 from a front opening 28 of the chassis 12 without sliding the drawer 34 forward.

Referring again to FIG. 1, the panel of adapters 32 includes a face panel 42 that defines a number of openings 44 (only one shown). Adapters 46 are mounted within the openings 44. In the illustrated embodiment, the adapters are LC type adapters; however, other types of adapters, such as SC, ST, FC and MPO type adapters can also be used in accordance with the principles disclosed. Further, in the illustrated embodiment, the adapters 46 are blocked or grouped; each adapter block 58 including eight adapters 46 (four adapter pairs). Other number of adapters can be provided in an adapter block, such as four adapters (two adapter pairs), for example; the openings in the face panel 42 being correspondingly sized to receive the four-adapter blocks. Alternative, single adapters can be used and mounted with openings sized to receive the single adapters.

The openings 44 of the face panel 42 are arranged in rows; each row of mounted adapter blocks 58 defines an adapter array 48. What is meant by a row is that the openings 44 are arranged in a generally horizontal alignment, as opposed to being arranged in a column or in a vertical alignment; accordingly, the adapter arrays 48 are generally horizontal adapter arrays.

Figure 4:
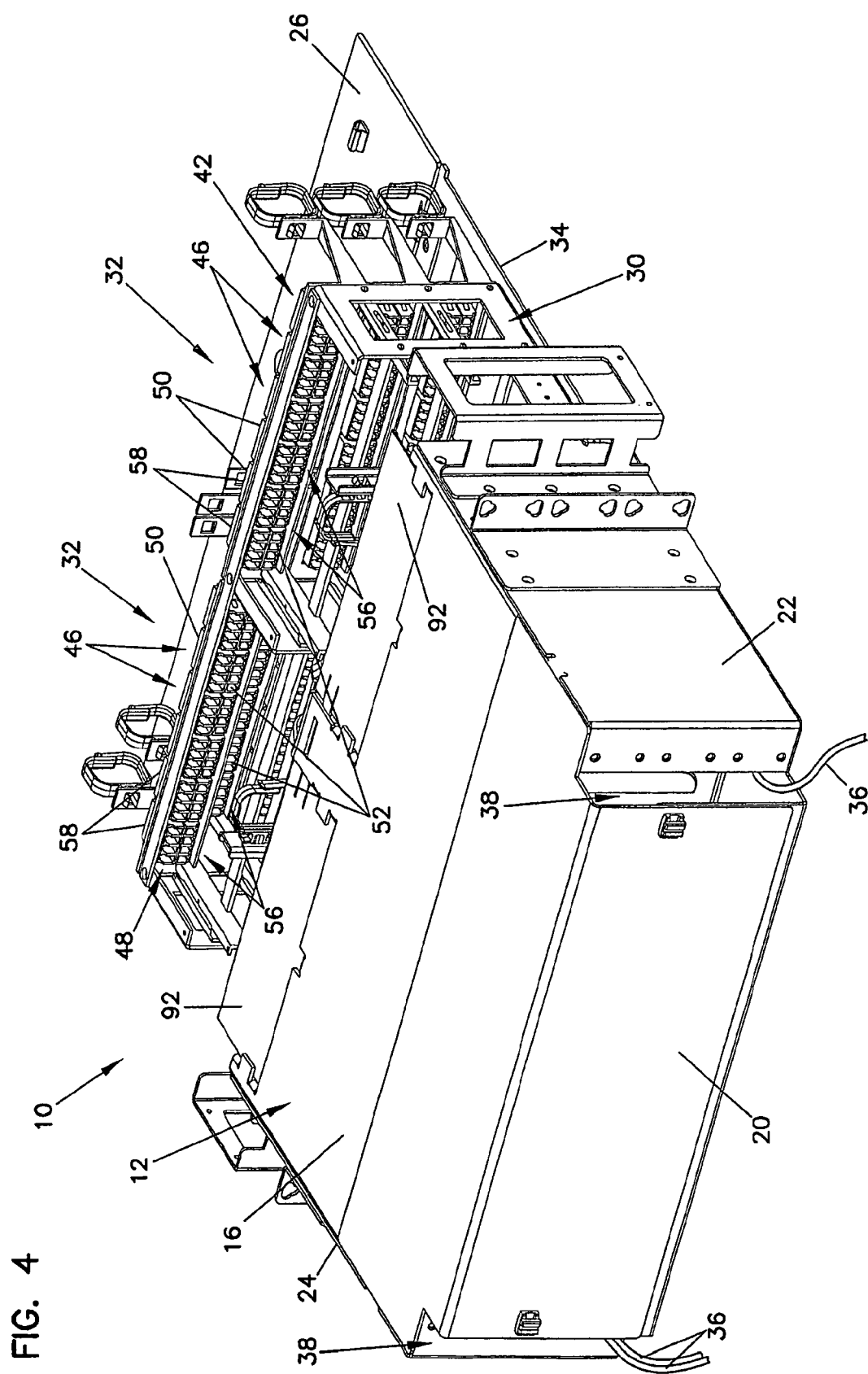
FIG. 4 is a rear perspective view of the adapter panel arrangement of FIG. 1.

Referring now to FIGS. 1 and 4, the adapters 46 of the adapter blocks 58 each includes a front connection end 50 (FIG. 1) and a rear connection end 52 (FIG. 4). When mounted within the openings 44, the front connection ends 50 of the adapters 46 are located toward the front opening 28 of the chassis 12, and the rear connection ends 52 of the adapters 46 are located toward the rear wall 20 of the chassis 12. The front connection ends 50 of the adapters 46 define open frontward cable connection locations 54 (FIG. 2) of the face panel 42. The rear connection ends 52 of the adapters 46 define open rearward cable connection locations 56 (FIG. 4) of the face panel 42.

What is meant by "open cable connection locations" are locations that are provided in an open region in the chassis 12, as opposed to a connection location that is enclosed within a housing or module, the housing or modules in turn being mounted within the chassis. That is, the panel of adapters 32 is a panel of unenclosed adapters 46 that are not enclosed relative to the other adapters 46 on the face panel 42. While the panel of adapters itself is enclosed within the chassis 12, the plurality of adapters 46, and each of the adapter arrays 48 are not enclosed separately from the other adapters 46 or the other adapter arrays 48.

Figure 5:
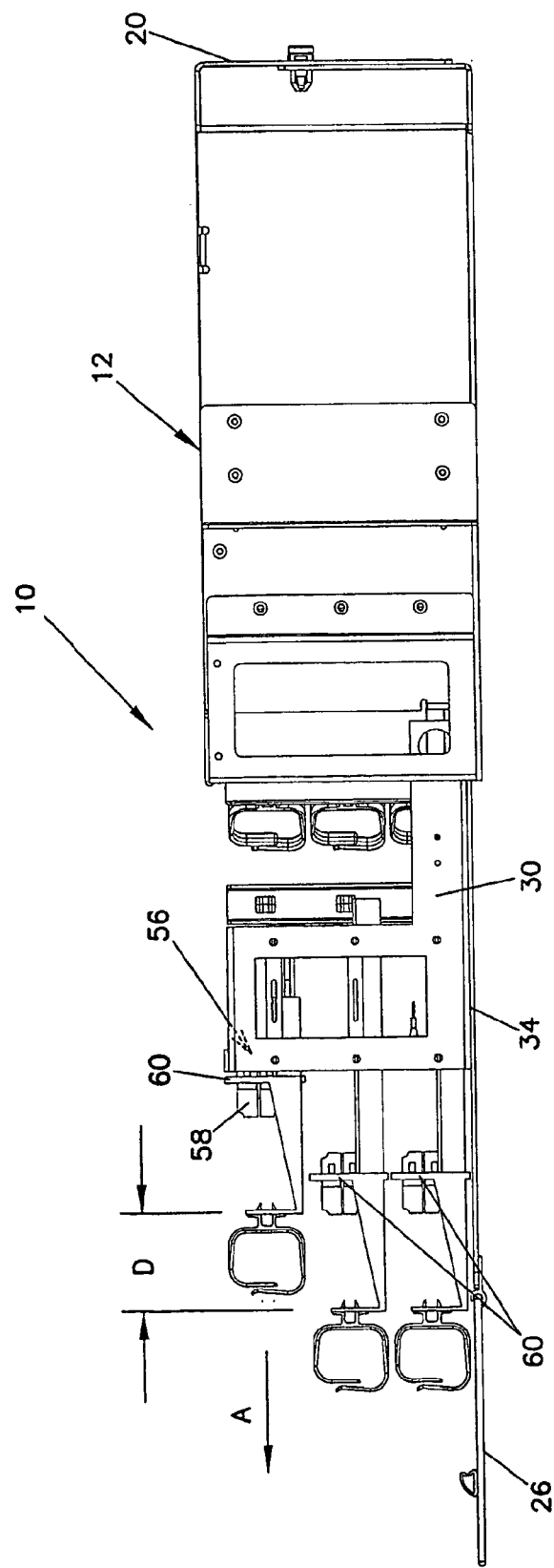
FIG. 5 is a side elevation view of the adapter panel arrangement of FIG. 4.
Figure 6:
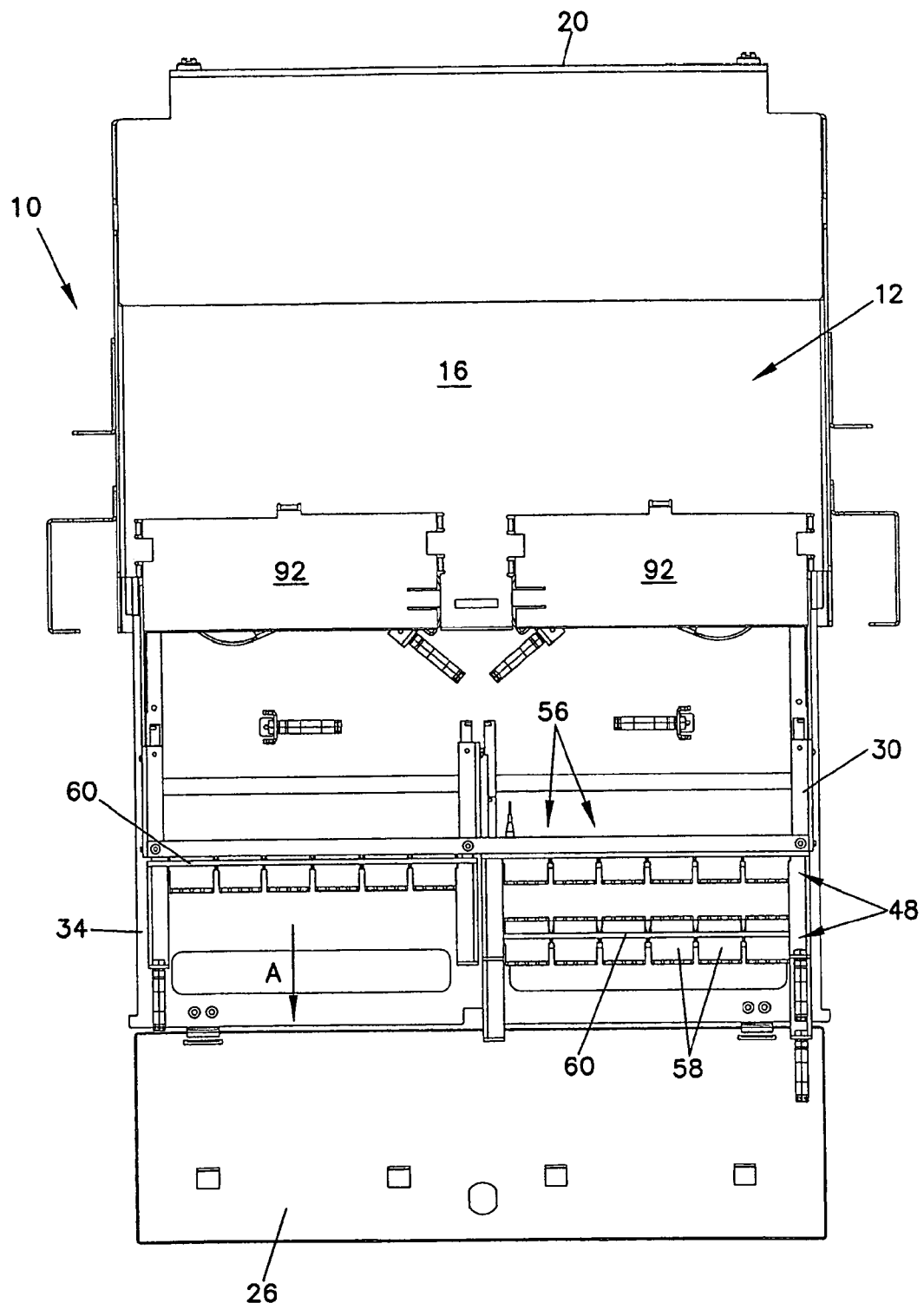
FIG. 6 is a top plan view of the adapter panel arrangement of FIG. 5.

Referring now to FIGS. 1, 5 and 6, the adapter arrays 48 of the face panel 42 are designed to slide in a lateral direction independent of other adapter arrays. In particular, the face panel 42 is defined by a number of separate panel sections 60. In the illustrated embodiment, each separate panel section defines one row of openings in which the blocks 58 of unenclosed adapters 46 are mounted, i.e., each panel section 60 contains one adapter array 48. In other embodiments, the panel sections can include, for example, two rows of openings that receive four-adapter blocks, for example; this panel section embodiment containing two adapter arrays.

The face panel 42 of the adapter panel arrangement 10 illustrated includes six panel sections 60—two panel sections 60 positioned side-by-side, and stacked three panel sections high (see FIG. 1). Each panel section 60 contains six blocks 58 having eight adapters 46 for a total of 288 frontward connection locations and rearward connection locations. Each separate panel section 60 is designed to selectively slide in a forward, lateral direction (A) independent of the other panel sections. The forward, lateral direction (A) is a direction extending between the front opening 28 and the rear wall 20, as opposed to a direction which is transverse to the bottom wall 18 of the chassis 12, for example.

Figure 7:
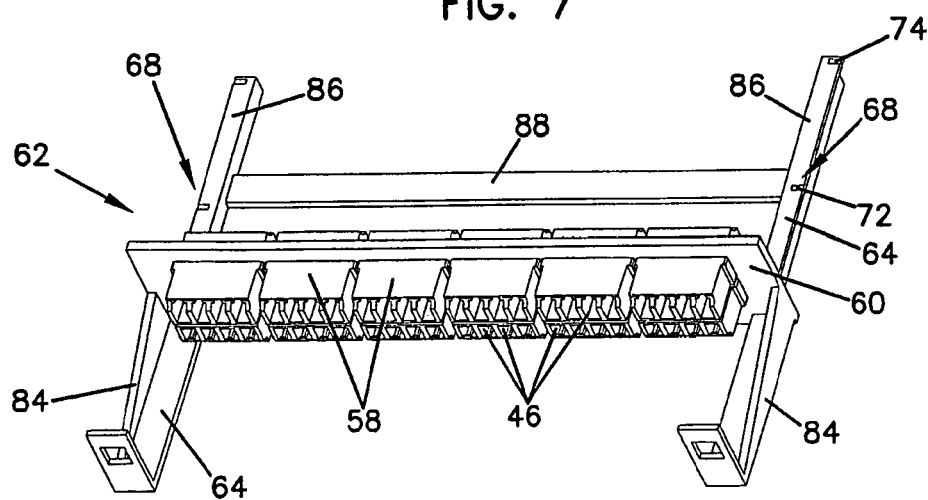
FIG. 7 is a top perspective view of one embodiment of a sliding frame piece and an adapter array of the adapter panel arrangement of FIG. 1, shown in isolation.
Figure 8:
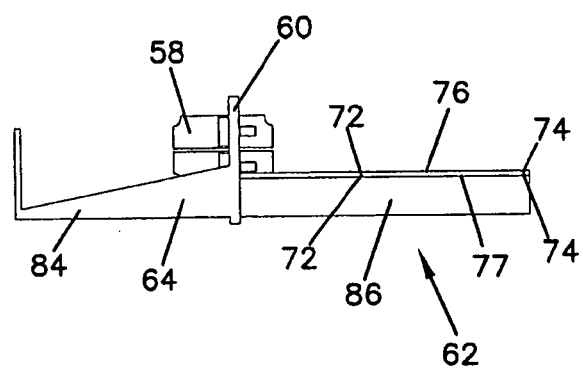
FIG. 8 is a side elevation view of the sliding frame piece and adapter array of FIG. 7.
Figure 9:
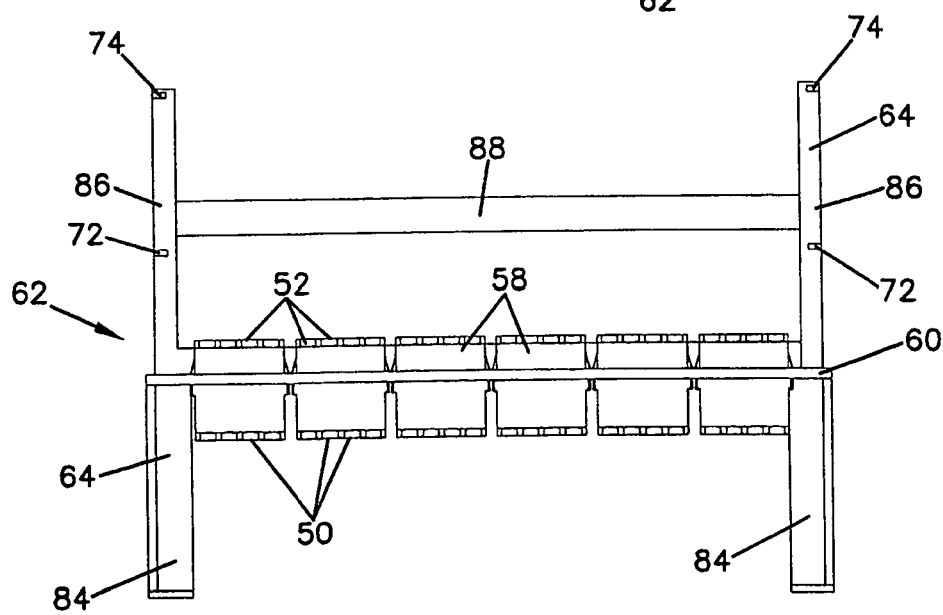
FIG. 9 is a top plan view of the sliding frame piece and adapter array of FIG. 7.

Referring to FIGS. 7-9, each separate panel section 60 of the panel of adapters 32 is attached to a sliding frame piece 62. The sliding frame piece 62 includes a pair of elongated rail members 64. In the illustrated embodiment, the elongated rail members 64 include a forward rail portion 84 that extends forwardly from the panel section 60, and a rearward rail portion 86 that extends rearwardly from the panel section 60. The sliding frame piece 62 can include a cross-support 88 to maintain the structural relationship of the rail members 64.

Figure 10:
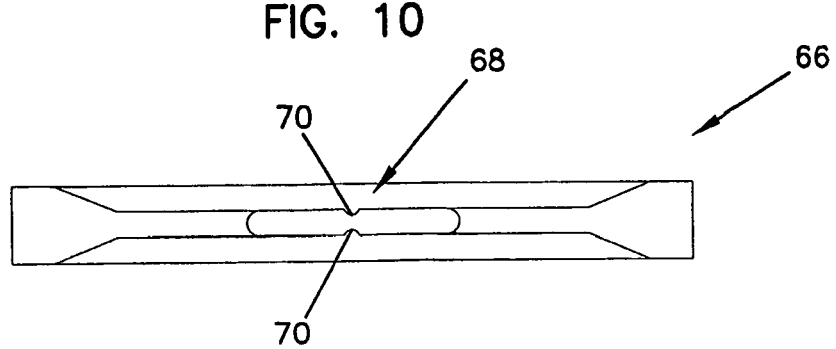
FIG. 10 is a side elevation view of one embodiment of a guide of the adapter panel arrangement of FIG. 1, shown in isolation.
Figure 11:
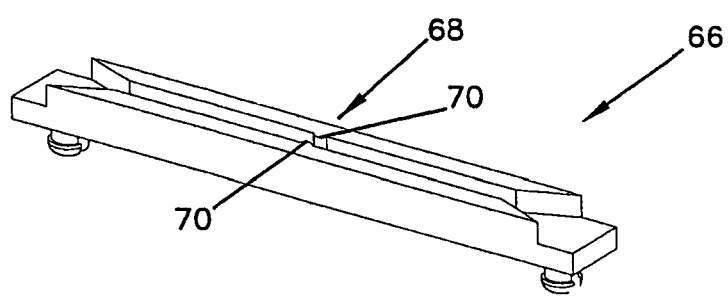
FIG. 11 is a bottom perspective view of the guide of FIG. 10.

The pairs of elongated rail members 64 are arranged to engage and slide within pairs of guides 66 (one shown in FIGS. 10-12) that are mounted to the framework structure 30 (FIG. 1) of the arrangement 10. The rail members 64 and the guides 66 include a stop arrangement 68 that limits the sliding motion of the panel sections 60 between a rearward position (see the top panel section 60 in FIG. 5) and a forward position (see the bottom panel section 60 in FIG. 5).

Referring to FIGS. 9-12, the stop arrangement 68 (FIG. 12) is defined by at least one projection 70 (FIGS. 10 and 11) located on each guide 66 of the pair of guides, and first and second pockets or detents 72, 74 (FIG. 9) formed in the rail members 64. In the illustrated embodiment, two projections 70 (upper and lower projections) are provided on each of the guides 66. Correspondingly, upper and lower detents 72, 74 (see FIG. 8) are formed in the rearward rail portions 86 of the rail members 64. While the illustrated embodiment depicts the detents 72, 74 formed in the rail members 64 and the projections 70 provided on the guides 66, it is contemplated that the detents can be formed in the guides 66 and the projection correspondingly provided on the rail members 64.

Figure 12:
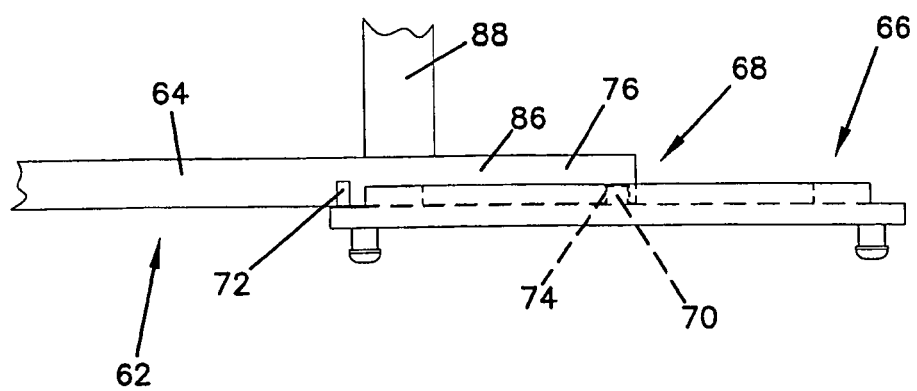
FIG. 12 is a top plan view of the guide of FIG. 10, and a portion of the sliding frame piece of FIG. 9.

Referring still to FIGS. 9-12, when the panel section 60 is positioned in the rearward position, the projections 70 of the guides 66 seat within the first detents 72 of the rail members 64 to retain the panel section 60 in the rearward position. The guides 66 are flexibly constructed so that when the panel section 60 is pulled forward, the projections 70 un-seat and slide along top and bottom surfaces 76, 77 (FIG. 8) of the rail members 64. Referring to FIG. 12, when the panel section 60 reaches the forward position, the projections 70 seat within the second detents 74 of the rail members 64. This stop arrangement 68 indicates to a user when the panel section 60 has reached the predetermined forward position, and similarly, the rearward position.

Referring back to FIG. 5, in general, the stop arrangement 68 provides an indication of when the panel section 60 has moved a lateral distance D forward from the rearward position to the forward position. In one embodiment, the lateral distance D is no more than about 4.0 inches forward from the rearward position. In the illustrated embodiment, the lateral distance D is about 1.7 inches. Providing such an indication to the user prevents the user from moving the panel section 60 a distance beyond that which cables interconnected to the panel section 60 will allow.

In particular, as previously described, the present panel arrangement 10 is designed such that the drawer 34 is intended to slide only during installation procedures, as opposed to post-installation or during operative use. Referring to FIG. 4, during installation, cables 36, such as fiber optic cables, are routed into the chassis 12 through rear openings 38 and terminated to the open rearward connection locations 56 of the face panel 42 (i.e., the rear connector ends 52 of the adapters 46).

The fiber optic cables 36 have a predetermined length that can be routed about cable storage spools or structures (see e.g., 78, 80 in FIG. 1). The predetermined lengths of the cables, however, do not have enough slack to accommodate drawer 34 movement during operative use, and the arrangement 10 does not have devices such as sliding radius limiters that take up or manage excessive movement of such cable slack.

In present panel arrangement 10, the predetermined lengths of the cables generally accommodate only the limited sliding movement of the panel sections 60. That is, while the drawer 34 may be slid out for purposes of installation, or for repairs requiring access to the region behind the panel of adapters 32, the drawer 34 is not intended to slide for purposes of accessing the panel of adapters 32 during operative use of the adapter panel arrangement 10. Operative use and access to the panel of adapters 32 is instead provided by the sliding movement of the panel sections 60 relative to the sliding movement of the drawer 34.

In general, the lateral sliding movement of the panel sections 60 provides access to the open cable connections (e.g., 54, 56) defined by the adapter arrays 48. Access to the open connection locations (e.g., 54, 56) of the face panel 42 is important in two primary instances: the first instance being during installation (e.g., during initial install or assembly, or during repair, replacement, or upgrade of the cable terminations at the rearward connection locations 56 of the panel 32); the second instance being after installation during operative use of the arrangement 10.

Referring back to FIGS. 1 and 4, during installation, the drawer 34 is pulled out to the open position. As previously described, a technician routes the fiber optic cables 36 through the rear openings 38 of the chassis 12 and terminates the cables to the open rearward connection locations 56 of the panel of adapters 32. To provide better access to the rear connection ends 52 of the adapters 46 defining the rearward connection locations 56, one of the adapter arrays 48 is positioned in the rearward position (e.g., the top array), while the remaining adapter arrays (e.g., the arrays located beneath the top array (see also FIGS. 5 and 6)) are positioned in the forward position. In this configuration, the technician has better access to the open rearward connection locations 56 of the one panel section 60 positioned in the rearward position. Once cable terminations to that particular adapter array 48 are complete, that adapter array can be slid forward and the next array to which cables are to be terminated slid rearward.

Referring to FIG. 4, to provide even further access to the open rearward connection locations 56, the top wall 16 of the chassis 12 includes removable access panels 92. Referring to FIG. 2, each of the panels 92 slides outward in a direction B from the top wall 16 of the chassis 12. In FIG. 2, the panels 92 are shown engaged with the top wall 16. In particular, each panel 92 is locked in place by a flexible tab 94 that engages a hem or roll 98 formed in a top wall portion 100 of the top wall 16. The flexible tab 94 is defined by slots 96 formed in the panel 92. The hem or roll 98 is formed by bending or rolling a section of the top wall 16 over on itself; although structure can be attached to the top wall as an alternative to providing a hem.

Figure 15:
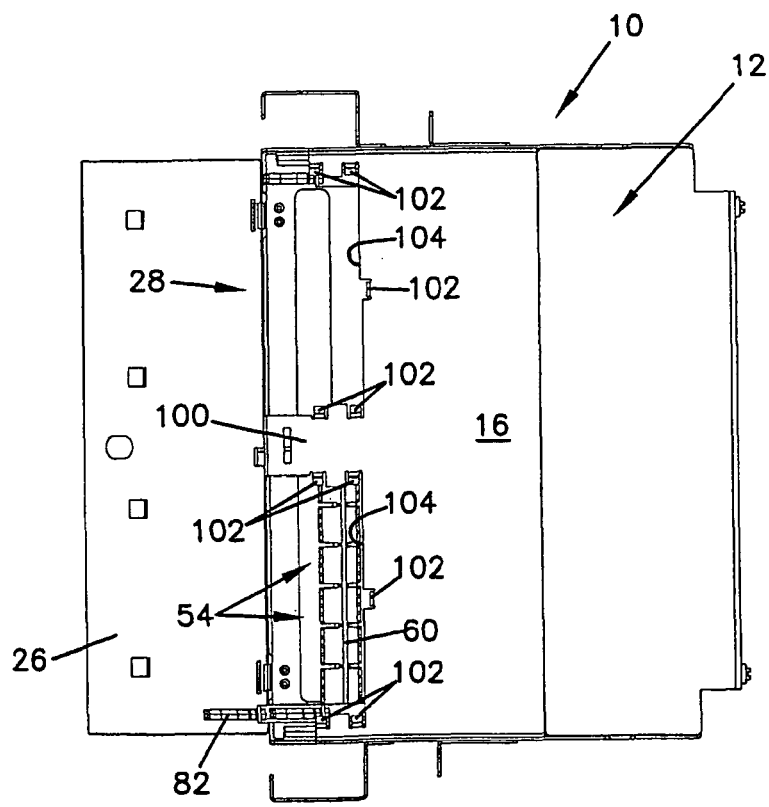
FIG. 15 is a top plan view of the adapter panel arrangement of FIG. 14.

To slide one of the panels 92 out, the flexible tab 94 is flexed downward beyond the hem or roll 98 formed in the top wall portion 100. The panel is then slid out in the direction shown in FIG. 2 and removed to define a top wall opening 104 (see e.g., FIG. 15) located adjacent to the front opening 28 of the chassis 12. The top wall opening 104 provides further access to the open rear connection locations 56. To re-attach the panel 92, the panel 92 is place in relation to the top wall opening 104, the flexible tab 94 is flexed downward, and the panel 92 is then slid back into place. As shown in FIG. 15, retaining flanges 102 are formed in the top wall 16 at the top wall openings 104. The retaining flanges 102 support the panels 92 when attached to the top wall 16 of the chassis 12.

The open rearward connection locations 56 are typically access only during installation procedures, with the exception of repairs or upgrades, for example. The open frontward connection locations 54, however, are accessed on a more regular basis to provide cross-connections between telecommunications equipment. Such use is referred to as operative use, or use that is post-installation and primarily involves maintaining or establishing cable terminations at the front connection ends 50 of the adapters 46.

Figure 13:
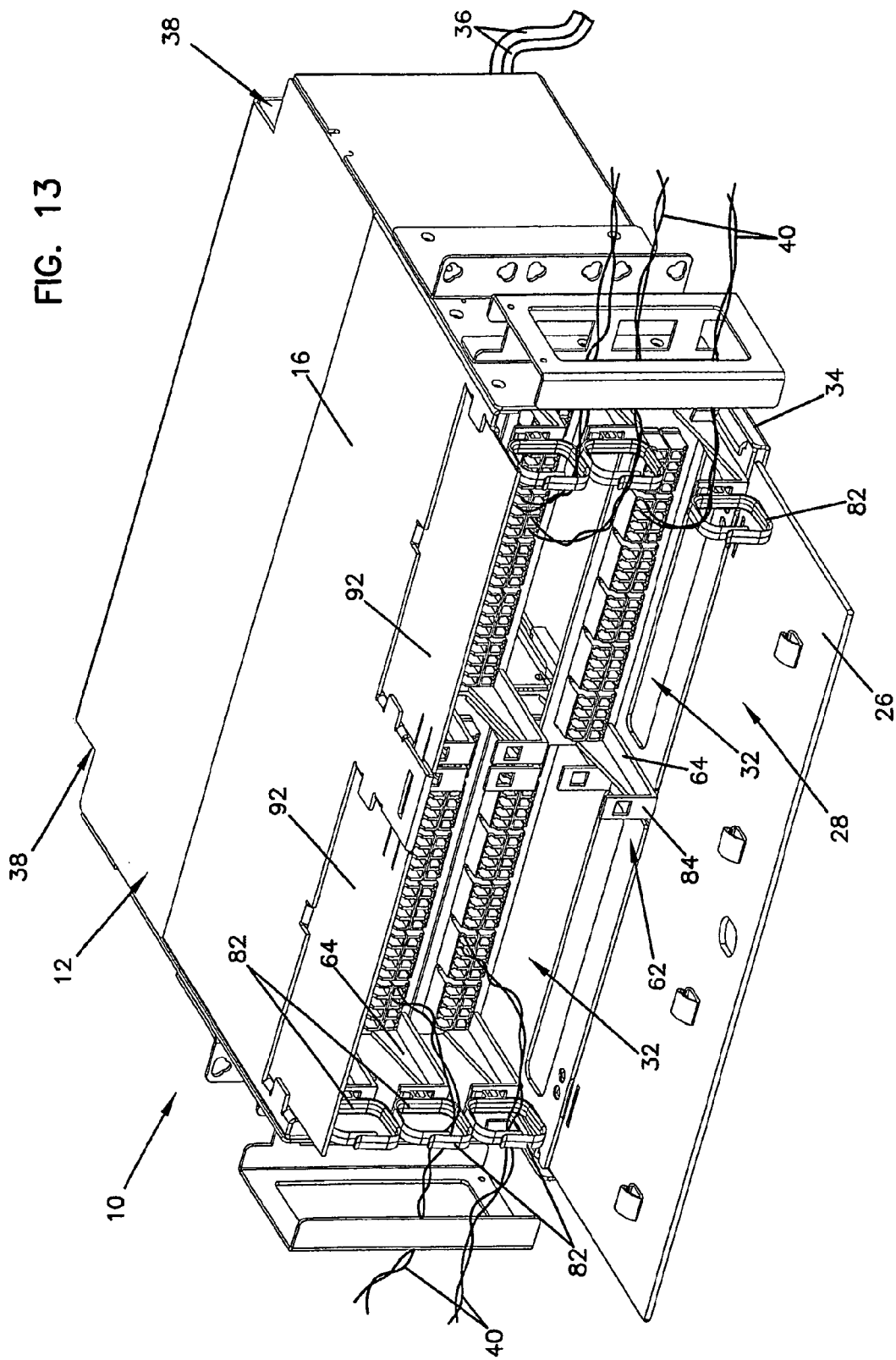
FIG. 13 is a front perspective view of the adapter panel arrangement of FIG. 2, shown with an adapter array positioned in a forward position.
Figure 14:
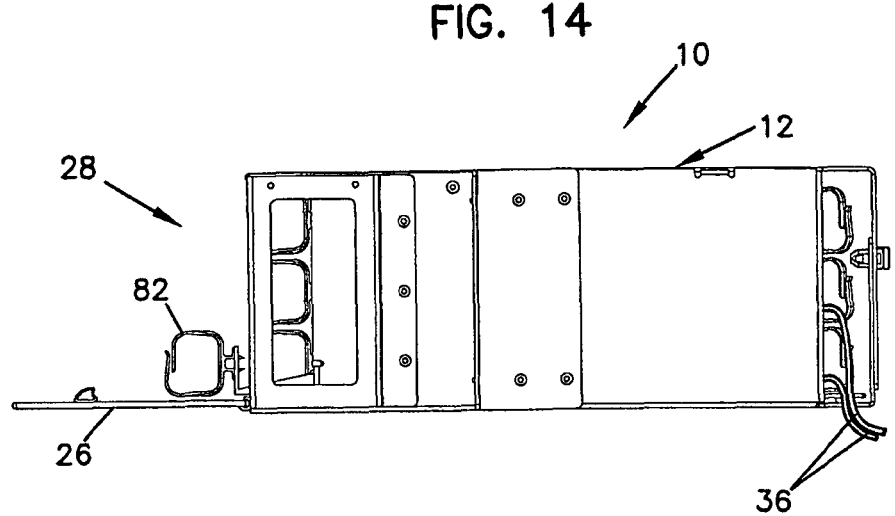
FIG. 14 is a side elevation view of the adapter panel arrangement of FIG. 13.

Referring now to FIGS. 13-15, the adapter panel arrangement 10 is shown in operative use. During operative use, the panel of adapters 32 is accessed through the front opening 28 of the chassis 12, with the drawer 34 positioned in the closed position.

As previously described, the cables 36 that enter the interior 14 of the chassis 12 through rear openings 38 are terminated to the open rear connection locations 56 of the panel of adapters 32. Referring to FIG. 13, jumper cables or patching cables 40 are also terminated to the panel of adapters 32; and in particular, to the open frontward connection locations 54 of the panel 32. The patching cables 40 provide the cross-connections between the adapter panel arrangement 10 and other telecommunications equipment (not shown). The patching cables 40 are routed from the front opening 28 and through side openings 90 (FIG. 3) of the chassis 12 to cable routing structure (e.g., channels, not shown) of the telecommunications system.

Because of the high-density arrangement of the adapters 46, each panel section 60 of the panel of adapters 32 slides forward to separate the associated adapter array 48 from the other arrays. By separately positioning the panel section 60 and the associated adapter array 48 forward, a technician can more easily grasp a particular connector of a patching cable 40, and/or more easily terminate a patching cable to a particular adapter 46 of the forwardly-positioned array. In addition, and as previously described, the access panels 92 (FIG. 13) of the top wall 16 can be removed (as shown in FIG. 15) to provide even further access to the open frontward connection locations 54 of the panel sections.

Referring again to FIG. 13, the forward rail portion 84 of the rail member 64 can be used as a handle to pull the panel section 60 forward. Alternatively, the user can slide the panel section 60 forward by grasping a retaining ring 82 attached to the rail member 64 of the sliding frame piece 62. In the illustrated embodiment, the retaining rings 82 are attached to the ends of outer rail members 64 of the sliding frame piece 62 to protect the patching cables 40 from exceeding a minimum bend radius.

While the present disclosure is described with respect to use in a fiber optic application, the disclosed panel arrangement can be adapted for use in other applications. For example, in some applications, copper cables may be used exclusively from fiber optic cables; and accordingly various types of wire terminations or wire connectors can be provided on the face panel of the arrangement. Still, in other applications having hybrid cabling, or applications having both types of fiber optic and copper cabling, the face panel of the arrangement can be provided with a combination of fiber optic and copper connectors and/or adapters.

In general, the present adapter panel arrangement 10 provides a high-density adapter panel arrangement while facilitating access to otherwise crowded front and rear connection locations. Because of the access design of the present arrangement, the amount of space utilized on racks and cabinets is minimized; or, in the alternative, allows for expansion and upgrade of systems having spatial constraints, as more densely packed connection locations are provided without sacrificing effective access to the connection locations.

The above specification provides a complete description of the present invention. Since many embodiments of the invention can be made without departing from the spirit and scope of the invention, certain aspects of the invention reside in the claims hereinafter appended.

What is claimed is:

1. A fiber optic apparatus, comprising:
   a chassis having a first side and a second side; and
   fiber optic connection equipment provided in the chassis, the fiber optic connection equipment comprising a row of forty-eight (48) fiber optic connection locations between the first and second sides of the chassis, each fiber optic connection location defining an LC connector port, each of the forty-eight (48) fiber optic connection locations aligned along the same horizontal plane, wherein each of the forty-eight (48) fiber optic connection locations is arranged in one of a plurality of groups, each group having at least four (4) of the forty-eight (48) fiber optic connection locations, and wherein the spacing between adjacent fiber optic connection locations within a group is less than the spacing between adjacent groups in the row.

2. The fiber optic apparatus of claim 1, wherein the row of forty-eight (48) fiber optic connection locations is a first row, wherein the fiber optic connection equipment further comprises a second row of forty-eight (48) fiber optic connection locations between the first and second sides of the chassis, wherein the second row is above the first row.

3. The fiber optic apparatus of claim 1, wherein the forty-eight (48) fiber optic connection locations are defined by LC adapters.

4. The fiber optic apparatus of claim 3, wherein the LC adapters are arranged in groups, each group having a plurality of LC adapters in the row.

5. The fiber optic apparatus of claim 4, wherein each group comprises two adapter pairs.

6. The fiber optic apparatus of claim 3, further comprising a plurality of separate frame members mounted to the chassis, wherein each of the groups is mounted to one of the frame members.

7. The fiber optic apparatus of claim 6, wherein each of the plurality of frame members is slidably mounted to the chassis.

8. The fiber optic apparatus of claim 7, wherein each of the plurality of frame members is slidable relative to the other frame members.

9. The fiber optic apparatus of claim 2, wherein the first and second rows of fiber optic connection locations fit within a vertical height of 1.7 inches.

10. The fiber optic apparatus of claim 1, wherein the chassis comprises first and second flanges at opposite sides of the chassis for mounting the chassis to a rack.

11. The fiber optic apparatus of claim 1, wherein the fiber optic connection equipment comprises a plurality of rows of fiber optic connection locations between the first and second sides of the chassis, each of the plurality of rows comprising forty-eight (48) fiber optic connection locations.

12. The fiber optic apparatus of claim 11, wherein the plurality of rows comprises a first row and a second row, and wherein each of first and second rows consists of forty-eight (48) fiber optic connection locations.

13. The fiber optic apparatus of claim 1, wherein the row consists of forty-eight (48) fiber optic connection locations.

14. The fiber optic apparatus of claim 1, wherein the row comprises only forty-eight (48) fiber optic connection locations.

15. A fiber optic apparatus, comprising:
    a rack-mountable chassis having first and second mounting flanges at opposite sides of the chassis; and
    fiber optic connection equipment mounted within the chassis, the fiber optic connection equipment comprising first and second rows of fiber optic connection locations, each of the first and second rows comprising forty-eight (48) ports, each of the forty-eight (48) ports in each of the first and second rows configured to receive an LC connector, wherein a first plurality of ports from the first row are arranged on a first frame member and a second plurality of ports from the first row are arranged on a second frame member adjacent to the first frame member and aligned in the same horizontal plane with the first frame member.

16. The fiber optic apparatus of claim 15, wherein the fiber optic connection equipment comprises a plurality of adapters that define the fiber optic connection locations in each of the first and second rows.

17. The fiber optic apparatus of claim 15, wherein each of the first and second frame members is slidably mounted to the chassis.

18. The fiber optic apparatus of claim 15, wherein the second row is beneath the first row, and wherein each of the first and second rows comprises only forty-eight (48) ports.

19. A fiber optic apparatus, comprising:
    a chassis having a first side and a second side; and
    fiber optic connection equipment mounted within the chassis, the fiber optic connection equipment configured to support ninety-six (96) a fiber optic connection locations in a one rack unit height, each fiber optic connection location defining an LC connector port, wherein the LC connector ports are not uniformly spaced as the ports extend between the first side and the second side of the chassis.

20. The fiber optic apparatus of claim 19, wherein the ninety-six (96) fiber optic connection locations comprise a first row of forty-eight (48) front ports all aligned along a first horizontal plane, the first row positioned between the first and second sides of the chassis.

21. The fiber optic apparatus of claim 20, wherein the ninety-six (96) fiber optic connection locations further comprise a second row of forty-eight (48) front ports all aligned along a second horizontal plane, the second row positioned between the first and second sides of the chassis.

22. The fiber optic apparatus of claim 19, wherein the fiber optic connection equipment comprises a plurality of adapters that define the fiber optic connection locations.

23. The fiber optic apparatus of claim 22, wherein the fiber optic connection equipment further comprises a plurality of separate frame members, wherein each of the plurality of adapters is mounted to one of the plurality of frame members.

24. The fiber optic apparatus of claim 23, wherein each of the plurality of frame members is slidably mounted to the chassis.

25. The fiber optic apparatus of claim 24, wherein each of the frame members slides relative to the other frame members in the plurality of frame members.

26. The fiber optic apparatus of claim 19, wherein the fiber optic connection equipment comprises two hundred and eighty-eight (288) fiber optic connection locations in a three rack unit height.

27. The fiber optic apparatus of claim 19, wherein the chassis comprises first and second flanges at opposite sides of the chassis for mounting the chassis to a rack.

28. The fiber optic apparatus of claim 22, wherein the adapters are LC adapters and are arranged in groups, each group comprising a plurality of LC adapters in a row.

29. The fiber optic apparatus of claim 19, wherein the fiber optic connection equipment has only ninety-six (96) fiber optic connection locations per one rack unit height.

30. The fiber optic apparatus of claim 1, wherein each group is slidable in a direction parallel to the horizontal plane between a forward position and a rearward position relative to the chassis and to at least one other group in the plurality of groups.

31. The fiber optic apparatus of claim 1, further including a sliding member that carries at least two of the plurality of groups, wherein the sliding member is slidable in a direction parallel to the horizontal plane between a forward position and a rearward position relative to the chassis.

32. The fiber optic apparatus of claim 31, wherein the sliding member is a drawer.

33. The fiber optic apparatus of claim 1, wherein each of the groups includes additional fiber optic connection locations that are not in the row.

34. The fiber optic apparatus of claim 1, wherein each group has at least four (4) pairs of fiber optic connection locations.

35. The fiber optic apparatus of claim 1, wherein a forwardly extending member is horizontally aligned with at least one of the spacings between adjacent groups in the row, the forwardly extending member terminating in a vertical portion positioned in a vertical plane that is forward of a plane occupied by the row of connection locations, wherein the forwardly extending member can be used for cable routing.

36. The fiber optic apparatus of claim 2, wherein each of the plurality of groups includes a plurality of fiber optic connection locations from the first row and a plurality of fiber optic connection locations from the second row.

37. The fiber optic apparatus of claim 15, wherein each of the first and second frame members slides relative to the chassis and slides relative to the other frame member.

38. The fiber optic apparatus of claim 15, further including a sliding member that carries the first and second frame members, wherein the sliding member is slidable in a horizontal plane between a forward position and a rearward position relative to the chassis.

39. The fiber optic apparatus of claim 15, wherein the ports within each of the first and second rows are not uniformly spaced as the ports extend between the opposite sides of the chassis.

40. The fiber optic apparatus of claim 39, wherein a gap separates the first plurality of ports on the first frame member and the second plurality of ports on the second frame member, wherein the gap is larger than the distance between adjacent ports on the first frame member and the distance between adjacent ports on the second frame member.

41. The fiber optic apparatus of claim 40, wherein a forwardly extending member is horizontally aligned with the gap, the forwardly extending member terminating in a vertical portion positioned in a vertical plane that is forward of a plane occupied by the first row of fiber optic locations, wherein the forwardly extending member can be used for cable routing.

42. The fiber optic apparatus of claim 15, wherein a first plurality of ports from the second row are arranged on the first frame member, and a second plurality of ports from the second row are arranged on the second frame member.

* * * * *